United States Patent [19]

Heinzen

[11] Patent Number: 5,785,323
[45] Date of Patent: *Jul. 28, 1998

[54] SEAL WITH ELECTRICAL CONDUCTOR WEAR INDICATOR

[76] Inventor: Ralph Heinzen, Box 728, Garrison, N. Dak. 58540

[*] Notice: The term of this patent shall not extend beyond the expiration date of Pat. No. 5,246,235.

[21] Appl. No.: 686,315

[22] Filed: Jul. 25, 1996

Related U.S. Application Data

[63] Continuation-in-part of Ser. No. 114,507, Nov. 2, 1993, Pat. No. 5,540,448, which is a continuation-in-part of Ser. No. 841,388, Feb. 25, 1992, Pat. No. 5,246,235.

[51] Int. Cl.[6] ............................................. F16J 15/16
[52] U.S. Cl. .......................... 277/582; 277/919; 116/208
[58] Field of Search ........................ 277/2, 907; 116/208; 384/448

[56] References Cited

U.S. PATENT DOCUMENTS

| | | | |
|---|---|---|---|
| 4,184,145 | 1/1980 | Fima | 116/208 |
| 4,832,160 | 5/1989 | Fargier et al. | 116/208 |
| 4,833,440 | 5/1989 | Wojtanek | 338/114 |
| 4,936,197 | 6/1990 | Brent | 277/103 |
| 5,111,178 | 5/1992 | Bosze | 338/160 |
| 5,540,448 | 7/1996 | Heinzen | 277/2 |

FOREIGN PATENT DOCUMENTS

| | | | |
|---|---|---|---|
| 3444175 | 3/1986 | Germany | 277/2 |
| 0031263 | 3/1977 | Japan | 277/2 |
| 0005159 | 1/1979 | Japan | 277/2 |
| 0117852 | 9/1979 | Japan | 277/2 |
| 0204374 | 12/1982 | Japan | 277/2 |
| 0976172 | 11/1982 | U.S.S.R. | 277/2 |

*Primary Examiner*—William A. Cuchlinski, Jr.
*Assistant Examiner*—John L. Beres
*Attorney, Agent, or Firm*—Friederichs Law Firm

[57] ABSTRACT

A seal for preventing leakage of fluid from between a first member and a second member, the second member is capable of moving toward and away from the first member, the seal is adapted for engaged contact with the first member and the second member so as to prevent leakage of fluid between the first member and the seal and between the second member and the seal, the seal being softer than the second member such that friction between the seal and the second member wears the seal faster than the second member, the seal being adapted to retain a tight seal against the second member as long as the seal has not worn beyond a specified depth; and a conductor for placement about the second member, the conductor being attached to the seal at the specified depth so as to contact the second member when the seal has worn to the specified depth, such that the existence of electrical continuity between the conductor and the second member indicates that the seal requires replacement, the conductor is positionally associated to the seal such that wear of the seal corresponds with movement of the conductor toward the second member; and the electrical continuity indicates whether the seal requires replacement.

8 Claims, 4 Drawing Sheets

SEAL WITH ELECTRICAL CONDUCTOR WEAR INDICATOR

BACKGROUND OF THE INVENTION

This application is a continuation-in-part of copending application Ser. No. 08/114,507 filed Nov. 2, 1993 now U.S. Pat. No. 5,540,448, issued Jul. 30, 1996 which is a continuation in part Ser. No. 841,388 filed Feb. 25, 1992, of U.S. Pat. No. 5,246,235 issued Sep. 21, 1993, entitled "SEAL WITH EMBEDDED WIRE".

The present invention relates to seals which are positioned against a moving surface, and more particularly to seals which prevent fluid, e.g. lubricant, leakage between two surfaces. The seal includes a conductor for indicating that the body of the seal has undergone excessive wear. The conductor is embedded within or attached to the body of the seal at a specified depth, namely the depth of acceptable wear. The electrical continuity of the conductor can be checked to determine if the seal body has worn to the specified depth.

Machinery often includes members which move with respect to each other. Bearings have long been used to facilitate such movement. Bearings are used to aid in transmitting forces from one member to another and to reduce friction. Rolling elements are often used in bearings to reduce friction, such as in ball bearings. Bearings often contain lubricant to reduce the friction created within the bearing.

In other instances metal or polymeric seals are placed between the moving parts. This arrangement is particularly useful when the movement is a reciprocal movement. An illustration is the piston and cylinder structure.

Leakage of fluid has long been a problem. Contamination of the bearings or seals with foreign material such as dirt has also long been a problem. Both loss of fluid and contamination lead to increased friction and wear within the structure, damaging the structure and perhaps damaging the machinery.

Seals composed of a soft polymeric material are used with bearings to prevent lubricant leakage and contamination. The polymeric material contacts a moving surface in the bearing and provides a seal. Friction between the polymeric material and the moving surface gradually wears the surface of the polymeric material away. If the polymeric material becomes too worn, it will no longer form a tight seal against the moving surface, and fluid leakage from the bearing and contamination of the bearing again become problems.

Various methods have been developed to prevent or detect leakage past a seal. As shown in U.S. Pat. No. 4,761,023, one method involves monitoring the pressure of the fluid on the high pressure side of the seal, with a loss of pressure indicating leakage past the seal. Alternatively, as shown in U.S. Pat. No. 4,290,611, the fluid pressure on the low pressure side of the seal may be monitored, with an increase in pressure indicating fluid leakage. A third method, such as that shown in U.S. Pat. No. 4,178,133, uses colored fluid and visual monitoring of leakage past a seal. Still other methods involve manual maintenance procedures, wherein seals are inspected or replaced on a regular basis.

These various methods to prevent or detect leakage past a seal have not proven satisfactory due to a number of problems. A problem with monitoring fluid pressure is that it is only effective to detect leakage of the fluid. Often this is too late to prevent damage. It is desired that the seal be replaced before leakage has begun. Similarly, visual monitoring of fluid leakage can only indicate that leakage has begun, not that leakage is about to begin. A problem with manual inspection of a seal is that it requires an inspector who is not only trained but also diligent. Often seals are not inspected merely due to neglect or lack of diligence. Another problem with manual inspection is that it may require the machinery to be stopped during the inspection, which can be inconvenient. Scheduled seal replacement also has problems. Seals may wear more or less quickly depending on operating conditions, and scheduled seal replacement may occur too early (before the seal needs to be replaced) or too late (after the seal starts leaking).

An excellent solution to these problems has been provided by the invention disclosed in my copending application U.S. patent application Ser. No. 08/114,507 filed Aug. 31, 1993 now U.S. Pat. No. 5,540,448, issued Jul. 30, 1996 and my U.S. Pat. No. 5,246,235. The present invention is an improvement on my earlier disclosed seals and is particularly adapted to work with reciprocating surfaces which require a seal there between. Illustrative of such reciprocating surfaces are the piston and cylinder, hatches, air locks, doors, covers, lids, and caps.

SUMMARY OF THE INVENTION

The present invention provides a seal for recognizing excessive seal wear before fluid leakage occurs. The seal is placed against a moving surface and forms a seal with the moving surface to prevent fluid leakage. The seal includes a seal body and an electrical conductor. The seal body is composed of a substance which allows it to make a seal with the adjacent moving surface. Friction between the moving surface and the seal body causes gradual wear of the seal body.

The electrical conductor may be embedded in the seal body, attached to the seal body or otherwise positioned so that wear of the seal body will gradually change the location of the conductor with respect to the adjacent moving surface. Wear of the seal body to a specified depth can be detected by electrical continuity of the conductor. The conductor may contact the adjacent surface when wear of the seal body reaches a specified depth, with electrical continuity between the conductor and the adjacent surface indicating that the seal requires replacement. Alternatively, the conductor may be positioned such that it is worn entirely through when the wear of the seal body reaches a specified depth, with loss of electrical continuity through the conductor indicating that the seal requires replacement.

The present invention provides a simple, cost effective device and method to detect wear of a seal disposed between reciprocating surfaces, avoiding the problems of previous devices. Because the device detects wear of the seal body rather than fluid leakage, the seal can be replaced prior to leakage. The problems associated with waiting until after leakage has begun before replacing the seal are avoided. The seal can be replaced in a timely manner before leakage begins. Because the present invention is based on electrical continuity, an electrical signal circuit can easily be incorporated with the invention. The signal circuit can indicate to an operator when a seal needs to be replaced, and there is no problem with diligence on the part of an inspector. Because wear of the seal body can be determined without manual inspection, problems with training inspectors and with missed or failed inspections are avoided. There is also no need to stop the equipment or machinery just to check if the seal needs to be replaced. Because the present invention monitors the actual amount of wear on the seal body, there is no problem with early or late replacement of the seal based on a scheduled replacement program. Replacement of the seal of the present invention is based on the actual life of the seal body in operation, not on an average seal body life. Seals can be replaced less often and cost is reduced.

DETAILED DESCRIPTION OF THE PREFERRED EMBODIMENTS

Figure 1:
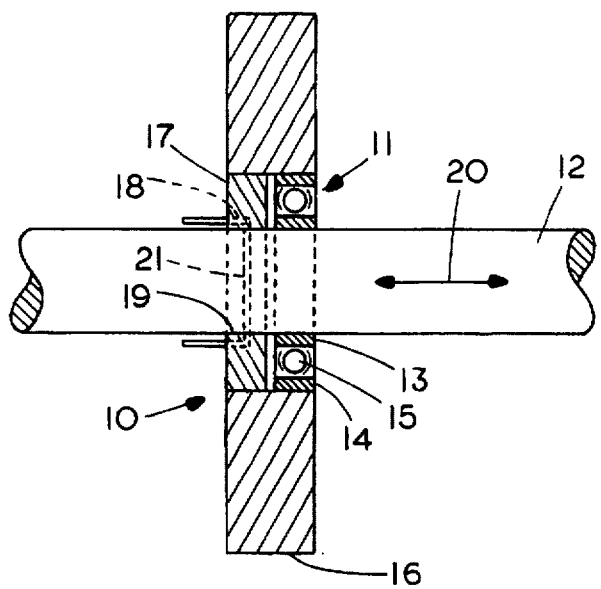
FIG. 1 shows a cross-sectional side view of the seal in place, adjacent a bearing and around a reciprocating shaft.

FIG. 1 shows the seal 10 of the present invention in place, against a bearing 11 and around a shaft 12. The shaft 12 may reciprocate as indicated by arrow 20. The bearing 11 may have an inside race 13, and outside race 14, and a plurality of rolling elements, e.g. balls 15. The inside race 13 may be movably engaged with the shaft 12. In other words the shaft may reciprocate in said bearing. The outside race 14 and the seal 10 may be connected to a housing 16. The bearing may be of spherical balls, as shown.

The seal 10 of the present invention includes a seal body 17 and an embedded conductor 18. As shown in FIG. 1, the seal body 17 may press against the shaft 12, forming a tight seal between the seal body 17 and the shaft 12. Alternatively, the seal body 17 may press against the inside race 13, forming a tight seal between the seal body 17 and the inside race 13. The seal body 17 functions to prevent fluid leakage from the bearing 11.

The seal body 17 may have a contact surface 19 defined as the surface which contacts the adjacent moving surface of the shaft 12 to form a tight seal. The seal body 17 may be composed of a polymeric material or other suitable substance and should be a dielectric or an electrical insulator. The material of the seal body 17 is softer than the shaft 12 so that friction preferentially wears the seal body 17 rather than the shaft 12. The contact surface 19 of the seal body 17 gradually wears away due to friction between the outer surface of the shaft 12 and the seal body 17.

Figure 2:
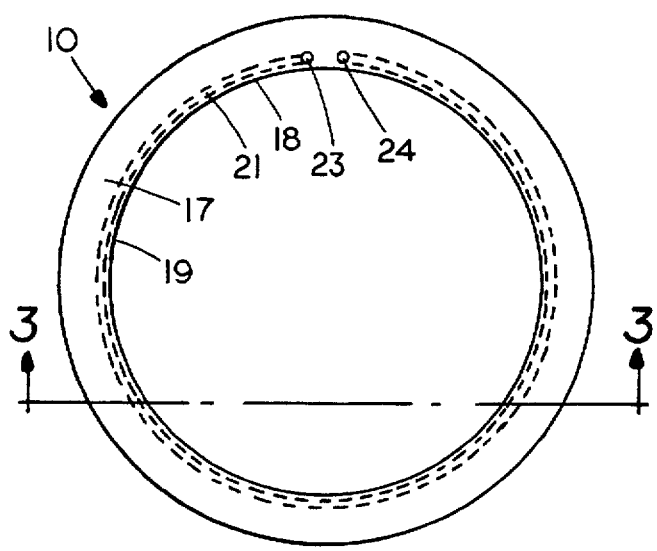
FIG. 2 is an enlarged fragmentary side view of the seal of the present invention.

FIG. 2 shows a conductor 18 embedded within the seal body 17 at a specified depth. Alternatively, the conductor 18 may be attached to the outside of the seal body 17 at a specified depth. The seal body 17 may be initially formed such that the contact surface 19 has an interference fit with the outer surface of the shaft 12. The portion of the seal body 17 forming the interference fit may be referred to as the wear lip. The specified depth at which the conductor 18 is embedded within or attached to the seal body 17 may be slightly less than the depth of seal wear which will cause the seal 10 to leak. For instance, the specified depth may be at 90% of the initial depth of the wear lip. In this case, if leakage of the seal 10 occurs when the wear lip is completely worn away, electrical continuity through the conductor would indicate when the seal is 90% worn toward leakage. Of course, the desired specified depth of the conductor 18 is dependant upon the particular application, and this example is not intended to limit the scope of the invention.

The conductor 18 may be composed of any material which conducts electricity, such as a metal wire or a carbon filament. Preferably, the conductor 18 may be formed of an electrically conductive polymer such as a conductive epoxy known as a polymer thick film. The polymer thick film may contain a polymer base material and a fill material to provide electrical conductivity. The fill material in the polymer thick film may be any material which will allow the polymer thick film to conduct electricity upon curing, such as particles of iron, aluminum, copper, silver, gold, or carbon. The polymer thick film material may exist in a liquid or paste form prior to curing into a solid. Alternatively, the polymer thick film material may exist in a solid solder form which converts to a liquid form upon heating. Polymer thick film materials are currently used in the surface mount of miniaturized electronic products such as microelectronic printed circuit boards.

The liquid or paste state of the polymer thick film provides ease of workability and application to the polymer material of the seal body 17, as well as reliable adherence to the seal body 17. The polymer thick film may be applied to the seal body 17 by brushing or by drawing a bead of polymer thick film out of a syringe onto the surface of the seal body 17. Alternatively, the polymer thick film may be applied to the seal body 17 through screen printing, masking or stenciling.

The cured polymer thick film may take on similar physical properties to the polymeric material of the seal body, including that the thick film application is softer than the shaft 12 so that friction preferentially wears the thick film application rather than the shaft 12. Accordingly, the polymer thick film may itself form part or all of the contact surface 19 at various depths of seal wear.

An example of a polymer thick film material is PTEA400 manufactured by Pinnacle Technologies, Inc. of Mattawans, Pennsylvania. The PTEA400 material is an epoxy adhesive base filled with gold particles. Upon curing, the PTEA400 material has a volume resistivity of 0.002 ohm-cm. The consistency of the PTEA400 material before curing is a smooth thixotropic paste. Curing of the PTEA400 takes place in approximately two hours at 150° C. or other similar conditions.

While the conductor 18 may be attached to the outside of the seal body 17 and openly exposed, it is preferable to insulate the conductor 18 by the seal body 17 or by an insulation layer of a dielectric or electrically nonconductive material. The insulation layer helps to prevent accidental or premature shorting of the conductor 18 with the shaft 12 or other exposed surfaces. The insulation layer may be provided by a material which is applied in a liquid or paste form, which dries or cures into a solid material. Using an insulating material which is applied in a liquid form has advantages similar to those discussed above for polymer thick films. The insulation layer may have similar physical properties to the polymeric material of the seal body, and the insulation layer may itself form part or all of the contact surface 19 at various depths of seal wear. An example of a material suitable for use as the insulation layer is LIQUID ELECTRICAL TAPE manufactured by Starbright of Fort Lauderdale, Florida.

Figure 3:
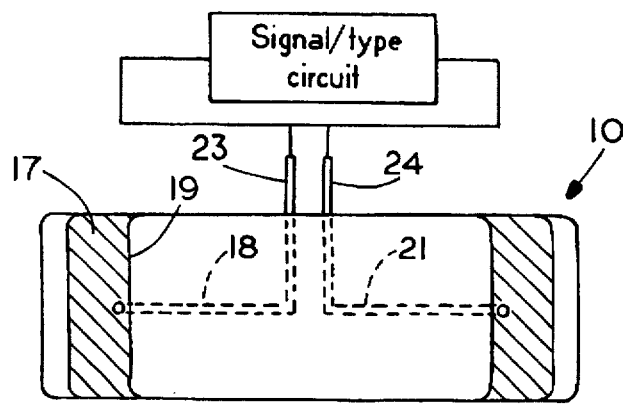
FIG. 3 is a cross-sectional view taken along the line 3—3 in FIG. 2.

As shown in FIG. 3, the conductor 18 may have a contact portion 21 together with a first post 23 and a second post 24. The first post 23 and the second post 24 may extend outside the seal body 17 for connection to an exterior signal-type electrical circuit, shown schematically. The electrical circuit may signal to an operator that the seal 10 requires replacement either based on the absence of electrical continuity through the contact portion 21 between the first post 23 and the second post 24, or based on the existence of electrical continuity between the conductor 18 and the shaft 12.

Figure 4:
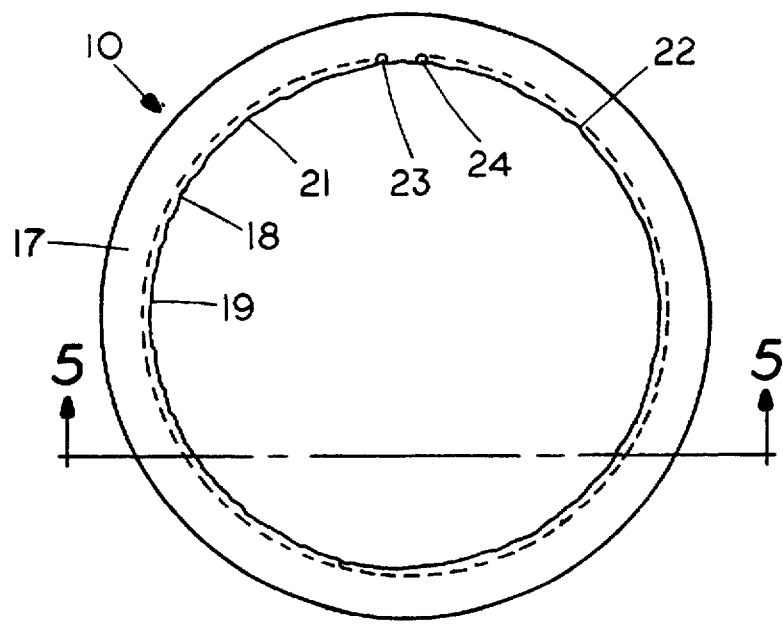
FIG. 4 is an enlarged fragmentary side view of the seal of the present invention, after the seal body has worn to the specified depth.
Figure 5:
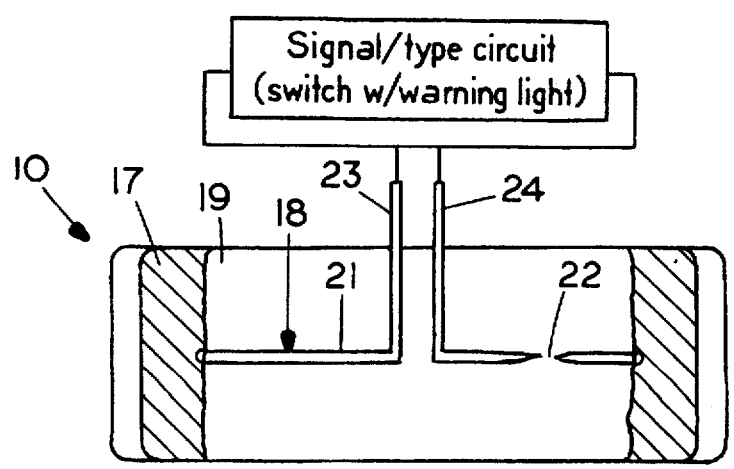
FIG. 5 is a cross-sectional view taken along the line 5—5 in FIG. 4, after the seal body has worn to the specified depth.

FIGS. 4 and 5 show the seal 10 immediately after friction between the shaft 12 and the seal body 17 has worn the seal body 17 to the specified depth. At this point, the contact portion 21 of the conductor 18 has worn completely through at point 22, so that there no longer is electrical continuity between the first post 23 and the second post 24. A suitable mechanism may be provided in the signal-type circuit to indicate lack of electrical continuity, such as an electromagnetically driven switch which actuates a warning light. Alternatively, a suitable mechanism such as an ohmmeter may monitor electrical resistance between the first post 23 and the second post 24, with an increase in resistance as the conductor 18 begins to wear at point 22 indicating the need for seal replacement.

Figure 6:
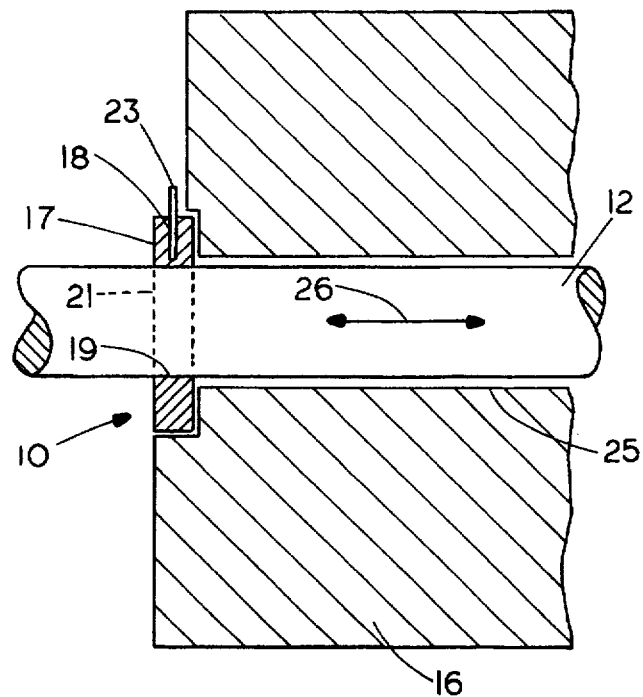
FIG. 6 shows a cross-sectional side view of an alternate embodiment of the seal in place, adjacent a bearing and around a shaft.
Figure 7:
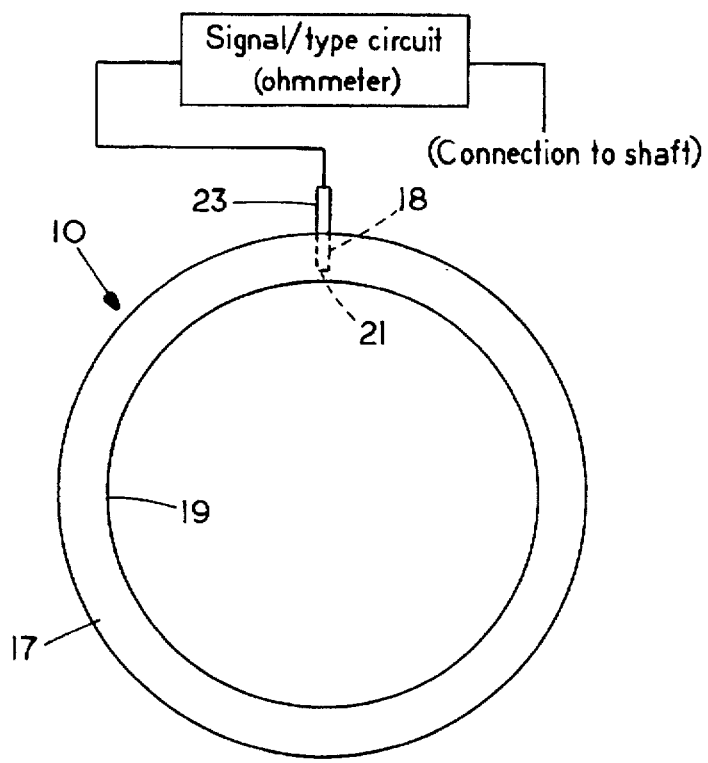
FIG. 7 is an enlarged fragmentary side view of the alternate embodiment of the seal shown in FIG. 6.

FIGS. 6 and 7 show an alternate embodiment of the seal 10 wherein the conductor 18 has only contact portion 21 and a first post 23. The contact portion 21 of the conductor 18 does not encircle the shaft 12 but merely ends at the specified depth. When wear of the seal body 17 reaches the specified depth, the contact portion 21 contacts the shaft 12, creating electrical continuity between the conductor 18 and the shaft 12. As shown in this alternate embodiment, the shaft 12 may reciprocate as indicated by arrow 26. The shaft 12 may alternatively oscillate, changing direction of rotation, or otherwise move with respect to the seal 10. The shaft 12 may ride on a bearing surface 25 of the housing 16. A suitable meter may be provided in the signal-type circuit to read the presence of electrical continuity, such as a ohmmeter.

Operation of the Invention

Although operation of the present invention is apparent from the preceding description, it will be detailed hereinafter to provide a more complete understanding of the present invention. As the contact surface 19 of the seal body 17 wears away, the conductor 18 gradually moves closer and closer to the shaft 12. As seal wear continues, the contact portion 21 of the conductor 18 contacts the shaft 12 and wears away along with the seal body 17. The conductor 18 is embedded or attached at a specified depth such that the conductor 18 can wear entirely through before the seal 10 begins to leak. When the contact portion 21 of the conductor 18 is worn entirely through, as shown in FIGS. 4 and 5 at point 22, there is no longer electrical continuity between the first post 23 and the second post 24. This may indicate to an operator that the seal body 17 has worn to a point such that the seal 10 requires replacement.

ALTERNATE EMBODIMENTS

Figure 8:
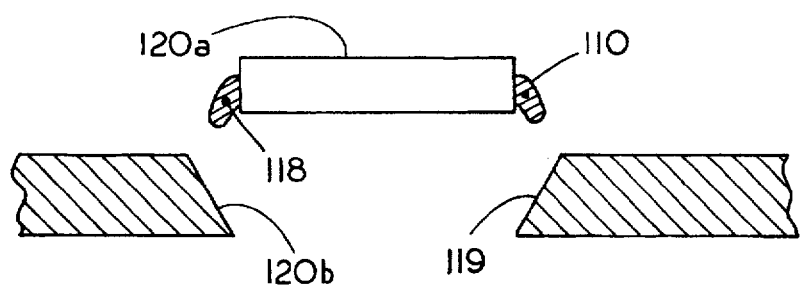
FIG. 8, is a cross-sectional side view of an alternate embodiment of the seal in place in a hatch.

FIG. 8 shows an alternate embodiment of the seal 110 wherein the seal is used in a hatch such as those used in ships and airplanes. The seal 110 is disposed between the hatch lid 120a and the opening 120b defined in the hold of the ship. FIG. 8 shows a conductor 118 embedded within the seal 110 at a specified depth. The seal 110 may be initially formed such that the contact surface 119 has an interference fit with the outer surface of the hatch lid 120a. The portion of the seal 110 forming the interference fit may be referred to as the wear lip. The specified depth at which the conductor 118 is embedded within or attached to the seal 110 may be slightly less than the depth of seal wear which will cause the seal 10 to leak. The electrical conductor 118 may be embedded in the seal body, attached to the seal body or otherwise positioned so that wear of the seal body will gradually change the location of the conductor with respect to the adjacent moving surface. Wear of the seal body to a specified depth can be detected by electrical continuity of the conductor. The conductor 118 may be positioned such that it is worn entirely through when the wear of the seal body reaches a specified depth, with loss of electrical continuity through the conductor indicating that the seal requires replacement. A suitable meter may be provided in the signal-type circuit to read the presence of electrical continuity, such as an ohmmeter.

Figure 9:
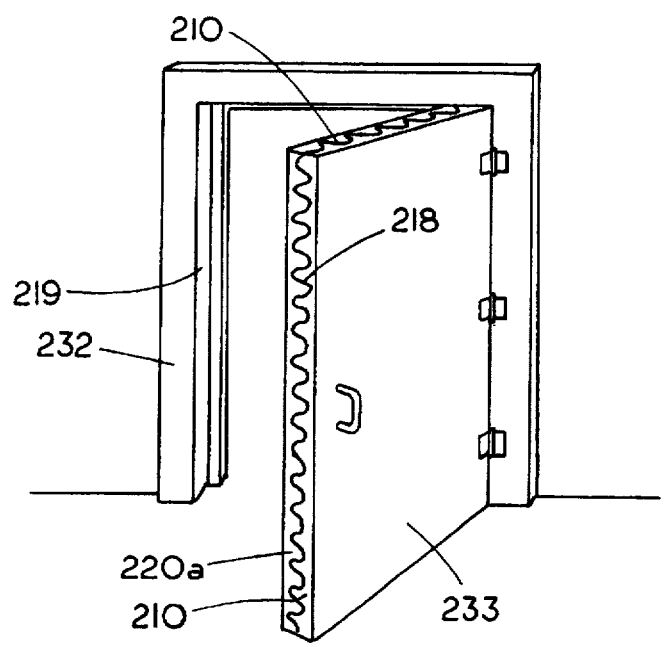
FIG. 9, is a cross-sectional side view of an alternate embodiment of the seal in place in a door.

FIG. 9 is a cross-sectional side view of an alternate embodiment of the seal 210 in place in a door structure 231. The door structure 231 includes a door jamb 232 and a pivotable door 233 such as might be used in a large commercial freezer. The seal 210 prevents movement of fluid between the door 233 and the door jamb 232. The door structure 231 is particularly useful in environments where the room is first closed by the door, filed with a gas and then exhausted of the gas before opening the door. This is done for example in gaseous treatment of metals. The seal 210 may be mounted either on the door itself or on the sill surrounding the door. FIG. 9 shows a conductor 218 embedded within the seal 210 at a specified depth. The seal 210 may be initially formed such that the contact surface 219 has an interference fit with the outer surface of the door 220a. The portion of the seal 210 forming the interference fit may be referred to as the wear lip. The specified depth at which the conductor 218 is embedded within or attached to the seal 210 may be slightly less than the depth of seal wear which will cause the seal 210 to leak. The electrical conductor 218 may be embedded in the seal body, attached to the seal or otherwise positioned so that wear of the seal will gradually change the location of the conductor with respect to the adjacent moving surface. Wear of the seal to a specified depth can be detected by electrical continuity of the conductor. The conductor 218 may be positioned such that it is worn entirely through when the wear of the seal body reaches a specified depth, with loss of electrical continuity through the conductor indicating that the seal requires replacement. A suitable meter may be provided in the signal-type circuit to read the presence of electrical continuity, such as an ohmmeter.

Figure 10:
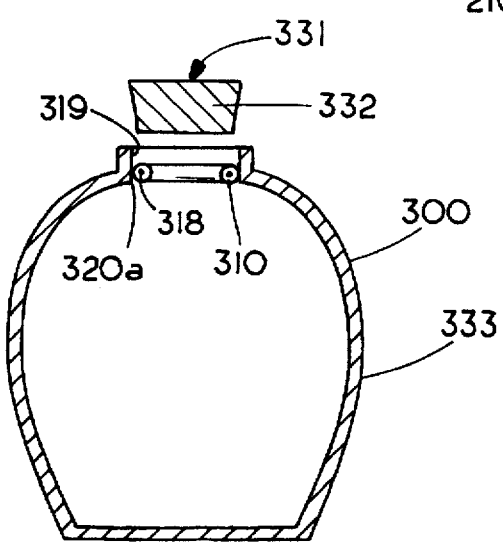
FIG. 10, is a cross-sectional side view of an alternate embodiment of the seal in place in a lid.

FIG. 10 is a cross-sectional side view of an alternate embodiment 310 of the seal in place in a lid structure such as a lid that is used in a vacuum pot or bottle 300. The lid structure 231 includes a lid 232 and a pot or bottle 233 such as might be used in a commercial laboratory. The seal 310 prevents movement of fluid between the bottle 333 and the lid 332. The lid structure 331 is particularly useful in environments where the vacuum bottle is first closed by the lid, evacuated. Alternatively the pot or bottle may be filled with a gas and then exhausted of the gas before opening the pot or bottle. This is done for example in gaseous treatment of metals or chemicals. The seal 310 may be mounted either on the lid itself or on the rim surrounding the opening the bottle. FIG. 9 shows a conductor 318 embedded within the seal 310 at a specified depth. The seal 310 may be initially formed such that the contact surface 319 has an interference fit with the outer surface of the bottle 320a. The portion of the seal 310 forming the interference fit may be referred to as the wear lip. The specified depth at which the conductor 318 is embedded within or attached to the seal 310 may be slightly less than the depth of seal wear which will cause the seal 310 to leak. The electrical conductor 318 may be embedded in the seal body, attached to the seal or otherwise positioned so that wear of the seal will gradually change the location of the conductor with respect to the adjacent moving surface. Wear of the seal to a specified depth can be detected by electrical continuity of the conductor. The conductor 318 may be positioned such that it is worn entirely through when the wear of the seal body reaches a specified depth, with loss of electrical continuity through the conductor indicating that the seal requires replacement. A suitable meter may be provided in the signal-type circuit to read the presence of electrical continuity, such as an ohmmeter.

Although the present invention has been described with reference to preferred embodiments, workers skilled in the art will recognize that changes may be made in form and detail without departing from the spirit and scope of the invention.

What is claimed is:

1. A seal for preventing leakage of fluid from between a first member and a second member, the second member moving in a reciprocal direction with respect to the first member, said seal comprising:

sealing means for engaged contact with the first member and the second member so as to prevent leakage of fluid between the first member and the sealing means and between the second member and the sealing means, said sealing means being softer than the second member such that friction between the sealing means and the second member wears the sealing means faster than the second member, said sealing means being adapted to retain a tight seal against the second member as long as said sealing means has not worn beyond a specified depth; and a conductor for placement about the second member, said conductor being attached to the sealing means at said specified depth so as to contact the second member when the sealing means has worn to said specified depth, such that the existence of electrical continuity between the conductor and the second member indicates that the seal requires replacement;

wherein the conductor is positionally associated to the sealing means such that wear of the sealing means corresponds with movement of the conductor toward the second member; and wherein electrical continuity indicates whether the seal requires replacement.

2. The seal of claim 1 wherein either of the first member or the second member is a reciprocating shaft and the other of the first member or the second member is a support structure.

3. The seal of claim 1 wherein either of the first member or the second member is a hatch defined in a ship and the other of the first member or the second member is an opening defined in a ship.

4. The seal of claim 1 wherein either of the first member or the second member is a door and the other of the first member or the second member is a door jamb.

5. The seal of claim 1 wherein either of the first member or the second member is a lid and the other of the first member or the second member is a bottle.

6. The seal of claim 1 wherein either of the first member or the second member is a piston and the other of the first member or the second member is a cylinder.

7. A method of determining wear of a seal having a sealing means which prevents leakage of a fluid from between a first member and a second member, the second member remaining a constant distance from and moving with respect to the first member, said method comprising the steps of:

placing a conductor in positional association to the sealing means such that said conductor substantially circumscribes sa id second member before the seal is worn, and about the second member such that the conductor will contact the second member when the sealing means has worn to a specified depth;

connecting an electrical circuit to the conductor; and determining electrical continuity through the conductor; wherein electrical continuity indicates whether the seal requires replacement.

8. A seal for preventing leakage of a fluid from between a first member and a second member, the second member remaining a constant distance from and moving with respect to the first member, said seal comprising:

sealing means for engaged contact with the first member and the second member so as to prevent leakage of fluid between the first member and the sealing means and between the second member and the sealing means, the sealing means having a contact surface, the contact surface being softer than the second member such that friction between the contact surface and the second member wears the contact surface faster than the second member, the contact surface being adapted to retain a tight seal against the second member as long as said contact surface has not worn entirely through to a specific depth; and a conductor which substantially circumscribes the second member before the seal is worn, the conductor adapted to conduct electricity, the conductor attached to the sealing means at a specified depth so as to contact the second member when the sealing means has worn to the specified depth, such that electrical continuity between the conductor and the second member indicates that the seal requires replacement.

* * * * *